(12) United States Patent
Diaz et al.

(10) Patent No.: US 9,243,125 B2
(45) Date of Patent: Jan. 26, 2016

(54) RELEASE POLYCARBONATE COMPOSITIONS

(71) Applicant: SABIC Innovative Plastics IP B.V., Bergen op Zoom (NL)

(72) Inventors: Mar Diez Diaz, Bergen op Zoom (NL); Lina Prada Obis, Bergen op Zoom (NL)

(73) Assignee: SABIC GLOBAL TECHNOLOGIES B.V. (NL)

(*) Notice: Subject to any disclaimer, the term of this patent is extended or adjusted under 35 U.S.C. 154(b) by 0 days.

(21) Appl. No.: 14/039,388

(22) Filed: Sep. 27, 2013

(65) Prior Publication Data

US 2014/0094550 A1 Apr. 3, 2014

(30) Foreign Application Priority Data

Sep. 28, 2012 (EP) ..................................... 12382377

(51) Int. Cl.
| A61L 15/62 | (2006.01) |
| C08K 5/11 | (2006.01) |
| B29C 67/24 | (2006.01) |
| C08K 5/103 | (2006.01) |

(52) U.S. Cl.
CPC . *C08K 5/11* (2013.01); *B29C 67/24* (2013.01); *C08K 5/103* (2013.01); *C08K 2201/014* (2013.01)

(58) Field of Classification Search
None
See application file for complete search history.

(56) References Cited

U.S. PATENT DOCUMENTS

| 4,460,752 | A | 7/1984 | Neuray et al. |
| 4,904,717 | A | 2/1990 | Ho et al. |
| 5,973,102 | A * | 10/1999 | McCloskey et al. ........... 528/196 |
| 6,008,280 | A | 12/1999 | Krishnan et al. |
| 6,359,042 | B1 | 3/2002 | Anders et al. |
| 6,555,646 | B2 | 4/2003 | Volkers et al. |
| 6,921,784 | B2 | 7/2005 | Dohi et al. |
| 7,084,233 | B2 | 8/2006 | Miyamoto et al. |
| 7,307,114 | B2 | 12/2007 | Hachiya et al. |
| 7,498,401 | B2 | 3/2009 | Agarwal |
| 7,786,246 | B2 | 8/2010 | Jansen et al. |
| 7,999,041 | B2 | 8/2011 | Goossens et al. |
| 8,133,564 | B2 | 3/2012 | Kitayama |
| 8,158,747 | B2 | 4/2012 | Tanabe et al. |
| 2004/0225047 | A1 | 11/2004 | Hachiya et al. |
| 2005/0215750 | A1 | 9/2005 | Koga et al. |
| 2007/0191518 | A1 | 8/2007 | Chen et al. |
| 2010/0099832 | A1 * | 4/2010 | Jansen et al. ................. 525/474 |
| 2011/0128494 | A1 | 6/2011 | Takahashi et al. |
| 2012/0095139 | A1 | 4/2012 | Yoshida et al. |
| 2014/0093673 | A1 | 4/2014 | Fernandez et al. |
| 2014/0094545 | A1 | 4/2014 | Roncaglia et al. |
| 2014/0234629 | A1 | 8/2014 | Sun et al. |
| 2014/0378591 | A1 | 12/2014 | Fernandez et al. |

FOREIGN PATENT DOCUMENTS

| CN | 102443256 A | 5/2012 |
| EP | 0732360 A1 | 9/1996 |
| EP | 1529632 A1 | 5/2005 |
| EP | 1268606 B1 | 8/2006 |
| EP | 2287655 A1 | 2/2011 |
| EP | 2423262 A1 | 2/2012 |
| JP | S6081245 A | 5/1985 |
| JP | 20001439361 A | 5/2000 |
| JP | 2001226477 A | 8/2001 |
| JP | 2014118415 A | 6/2014 |
| JP | 2014118416 A | 6/2014 |
| JP | 2005068375 A | 3/2015 |
| WO | 0015707 | 3/2000 |
| WO | 0073386 A1 | 12/2000 |
| WO | 2012141336 A1 | 10/2012 |
| WO | 2014049575 A2 | 4/2014 |

OTHER PUBLICATIONS

International Search Report for International Application No. PCT/IB2013/058951; International Filing Date Sep. 27, 2013; Dsate of Mailing Mar. 20, 2014; 5 pages.
Written Opinion of the International Search Report for International Application No. PCT/IB2013/058951; International Filing Date Sep. 27, 2013; Date of Mailing Mar. 20, 2014; 5 pages.
European Patent Office Search Report; Application No. 12382375.9-1301;Date of Search Feb. 15, 2013; Application Date Feb. 27, 2013.
CN 102443256 A; Machine Translation; Date of Publication Feb. 9, 2012; 26 pages.
JP 2000143961 A; Machine Translation; Date of Publication May 26, 2000; 20 pages.
Machine Translation of JP4290472 B2; Date of Issue Jul. 8, 2009; 28 pages.
European Search Report for European Application No. 14382081.9; Date of Completion: May 19, 2014; 5 pages.
U.S. Appl. No. 14/039,492, filed with the USPTO on Sep. 27, 2013.
U.S. Appl. No. 14/039,604, filed with the USPTO on Sep. 27, 2013.
International Search Report for International Application No. PCT/IB2013/058952; International Filing Date Sep. 27, 2013; Date of Mailing Jan. 30, 2014; 5 pages.
Written Opinion of the International Search Report for International Application No. PCT/IB2013/058952; International Filing Date Sep. 27, 2013; Date of Mailing Jan. 30, 2014; 5 pages.

(Continued)

*Primary Examiner* — Susannah Chung
*Assistant Examiner* — Robert T Butcher
(74) *Attorney, Agent, or Firm* — Cantor Colburn LLP

(57) ABSTRACT

The present application relates to a thermoplastic composition, comprising: a polycarbonate polymer; 0.05 to 0.2 weight percent of a triacylglyceride release agent; and 0.25 to 0.55 weight percent of a tetrastearate second release agent. The total amount of the triacylglyceride release agent and the second release agent is less than or equal to 0.6 weight percent and the weight percent values are based on the total weight of the composition.

28 Claims, 2 Drawing Sheets

(56) References Cited

OTHER PUBLICATIONS

Extended European Search Report for European Application No. 12382376.7; Date of Completion: Dec. 17, 2012; 6 pages.

JP 4290472 B2; Machine Translation; Date of Publication: Nov. 25, 2004; 28 pages.

JP2000143961 Machine Translation; Date of Publication: May 26, 2000; 10 pages.

* cited by examiner

RELEASE POLYCARBONATE COMPOSITIONS

CROSS-REFERENCE TO RELATED APPLICATION

This application claims the benefit of EP patent application Ser. No. 12382377.5 filed Sep. 28, 2012. The related application is incorporated herein by reference.

BACKGROUND

Polycarbonate is useful in a wide variety of applications in view of its good balance of properties, such as practical impact resistance, glass-like transparency, and moldability. In injection molding applications, effective mold release is a key property to enable efficient processing into formed articles. As such, a lower release force during the demolding of the parts is desirable. The lower release force may be achieved by adding a mold release agent to the thermoplastic composition. The release agent also helps to provide consistent processability.

Several materials, like polyesters, have the desired release performance. However, these materials have inferior mechanical properties, such as impact performance, compared to polycarbonate polymers. Further, these materials are difficult to process, as they have limited thermoformability for sheet applications and/or inadequate melt flow for injection molded parts.

An appropriate mold release not only facilitates processing, but should also be stable and inert during processing in such a way that it will not react with the polymer and other components, as well as preventing discoloring in time due to degradation. An appropriate mold release agent should not form deposits on the surface of the mold during injection molding nor on the roll calendar during extrusion processes and, therefore, become visible on the surface of the part causing aesthetic defects. Also, the additive should maintain transparency when required.

Conventional mold release agents, such as pentaerythrityl tetrastearate (PETS), provide acceptable release behavior in some applications. However, the release behavior is often not sufficient for relatively large parts or for parts with difficult profiles. The inadequate release behavior results in irregular processing or high release forces, possibly resulting in distortion of the ejected parts.

Accordingly, there remains a need for thermoplastic compositions that provide good release properties, while maintaining or improving other properties during processing. In one aspect of the disclosure, the advantageous synergistic effect of multiple release additives have been identified and described for injection molding applications. This and other needs are satisfied by the various aspects of the present disclosure.

SUMMARY

This disclosure relates generally to thermoplastic compositions, methods for making and articles using the same.

In an embodiment, a thermoplastic composition, comprising: a polycarbonate polymer; 0.05 to 0.2 weight percent of a triacylglyceride release agent; and 0.25 to 0.55 weight percent of a tetrastearate second release agent. The total amount of the triacylglyceride release agent and the second release agent is less than or equal to 0.6 weight percent and the weight percent values are based on the total weight of the composition.

The above described and other features are exemplified by the following figures and detailed description.

BRIEF DESCRIPTION OF THE DRAWINGS

The accompanying drawings, which are incorporated in and constitute a part of this specification, illustrate exemplary aspects and together with the description, serve to explain the principles of the compositions, methods and systems disclosed herein.

DETAILED DESCRIPTION

Figure 1:
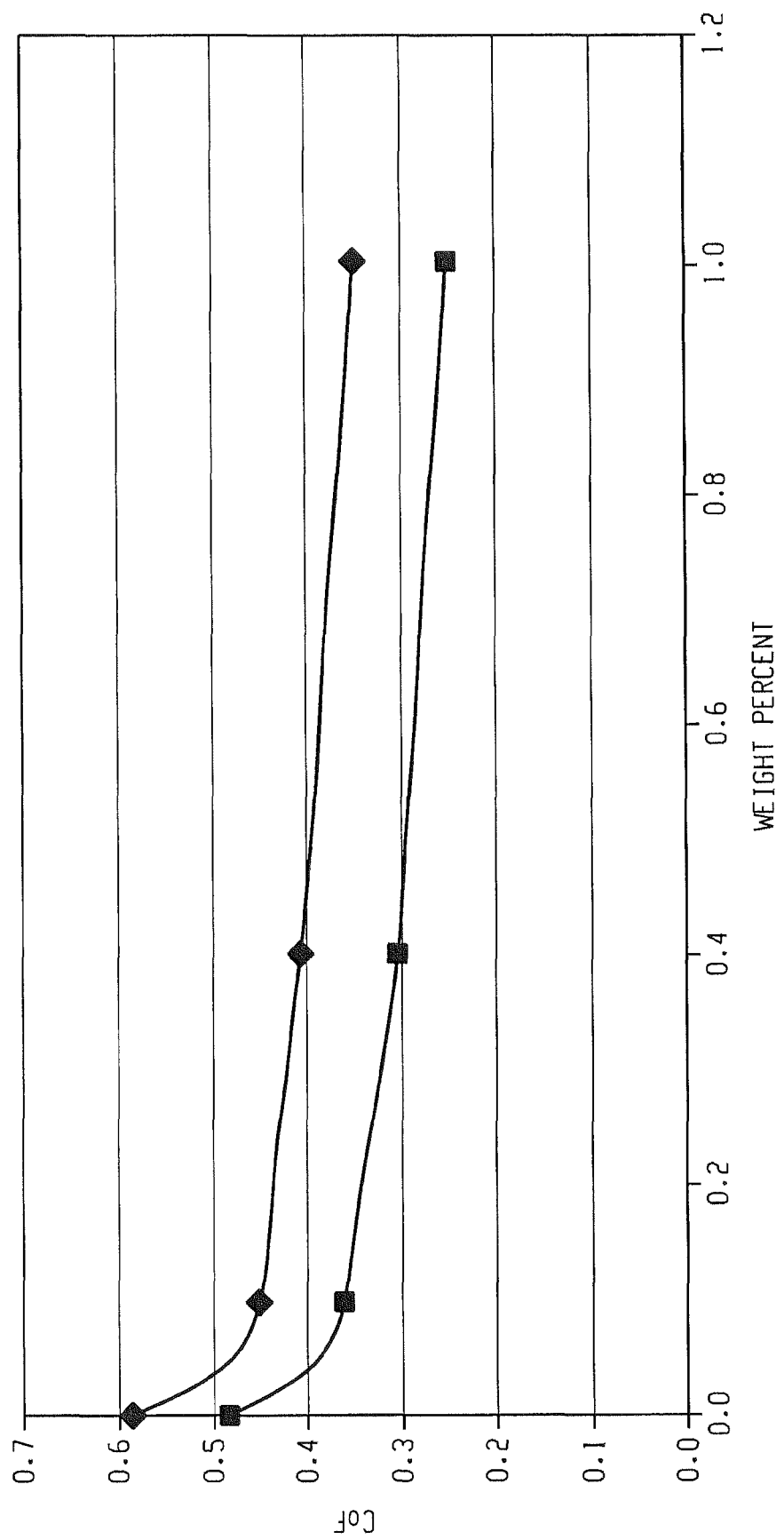
FIG. 1 is a graphical illustration of the friction coefficient of Examples 1-4.

The present disclosure can be understood more readily by reference to the following detailed description, examples, drawings, and claims, and their previous and following description. However, before the present compositions, articles, devices, systems, and/or methods are disclosed and described, it is to be understood that this disclosure is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes more than one filler.

Reference throughout the specification to "one embodiment", "another embodiment", "an embodiment", and so forth, as well as to "an aspect", "another aspect", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required can vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are the components to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8 weight percent (wt %), it is understood that this percentage is relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing one to six carbon atoms.

The term "alkenyl group" as used herein is a hydrocarbon group of 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "carboxylic acid" as used herein is represented by the formula —C(O)OH.

The term "aldehyde" as used herein is represented by the formula —C(O)H.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of 1 milligram per milliliter with appropriate mobile phase solvents.

The terms "polycarbonate" or "polycarbonates" as used herein includes, without limitation, copolycarbonates, homopolycarbonates, and (co)polyester carbonates.

The terms "residues" and "structural units", used in reference to the constituents of the polymers, are synonymous throughout the specification.

Each of the component materials disclosed herein for use in the manufacture of the disclosed thermoplastic compositions are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Thermoplastic Composition

The present disclosure relates generally to thermoplastic compositions, and, more particularly, to a thermoplastic composition comprising a release agent. To that end, according to various aspects of the disclosure, a thermoplastic composition is disclosed that generally comprises a polycarbonate polymer, a triacylglyceride release agent; and at least one second release agent.

In one aspect, the thermoplastic composition, comprises
a. a polycarbonate polymer; and
b. a triacylglyceride release agent;
c. a second release agent comprising:
  i. a fully esterified polyol fatty acid ester;
  ii. a polyol fatty acid partial ester;
  iii. a saturated alpha olefin oligomer;
  iv. a linear low density polyethylene; or
  v. a combination comprising at least one of the foregoing.
wherein the triacylglyceride release agent is present in an amount of 0.05 wt % to 1 wt % and the second release agent is present in an amount of 0.05 wt % to 1 wt % relative to the total weight of the thermoplastic composition.

Polycarbonate

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In various aspects, the polycarbonate can comprise copolymers comprising two or more distinct carbonate units. For example, a polycarbonate copolymer can comprise repeating carbonate units derived from 1,1-bis(4-hydroxyphenyl)methylphenylmethane (BisAP) and a second, chemically distinct dihydroxy monomer such as a bisphenol, e.g. bisphenol A. Alternatively, a polycarbonate copolymer can comprise repeating carbonate units derived from 2-phenyl-3,3-bis(4-hydroxyphenyl)phthalimidine (also known as N-phenyl phenolphthalein bisphenol, 3,3-bis(4-hydroxyphenyl)-2-phenyl-isoindolin-1-one, or "PPPBP") and a second, chemically distinct dihydroxy monomer such as a bisphenol, e.g. bisphenol A (BPA). In another aspect, the polycarbonate polymer comprises a polycarbonate copolymer formed from monomers comprising BPA and comprising dimethylbisphenol cyclohexanone (DMBPC), at least one isosorbide, or at least one aliphatic diol. In a further aspect, the polycarbonate copolymer is derived from at least one acid monomer. In an even further aspect, the polycarbonate polymer comprises a polycarbonate copolymer formed from monomers comprising BPA and comprising sebacic acid.

In one aspect, the polycarbonate a) comprises a bisphenol A polycarbonate. In another aspect, the polycarbonate a) comprises a blend of at least two different bisphenol A polycarbonates.

The polycarbonate-based resin may be selected from a polycarbonate or a resin blend that includes a polycarbonate. Accordingly, in one aspect, polycarbonates can be used as the base resin in the composition. Polycarbonates including aromatic carbonate chain units include compositions having structural units of the formula (I):

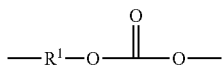
(I)

in which the $R^1$ groups are aromatic, aliphatic or alicyclic radicals. $R^1$ can be an aromatic organic radical and, in an alternative aspect, a radical of the formula (II):

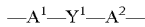 (II)

wherein each of $A^1$ and $A^2$ is a monocyclic divalent aryl radical and $Y^1$ is a bridging radical having zero, one, or two atoms which separate $A^1$ from $A^2$. In an exemplary aspect, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another aspect, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates can be produced by the Schotten-Bauman interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (III) as follows:

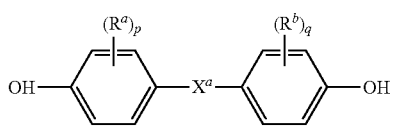 (III)

wherein $R^a$ and $R^b$ each independently represent hydrogen, a halogen atom, or a monovalent hydrocarbon group; p and q are each independently integers from 0 to 4; and $X_a$ represents one of the groups of formula (IV):

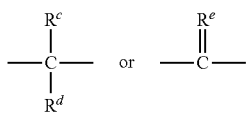 (IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by formula (IV) include the bis(hydroxyaryl) alkane series such as, 1,1-bis(4- hydroxyphenyl) methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis (4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl) propane, 2,2-bis(4-hydroxy-3-bromophenyl)propane, or the like; bis (hydroxyaryl)cycloalkane series such as, 1,1-bis(4-hydroxyphenyl)cyclopentane, 1,1-bis (4-hydroxyphenyl) cyclohexane, or the like, or combinations including at least one of the foregoing bisphenol compounds.

Other bisphenol compounds that can be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that can be utilized in the polycondensation of polycarbonate are represented by the formula (V)

 (V)

wherein, $R^f$, is a halogen atom of a hydrocarbon group having 1 to 10 carbon atoms or a halogen substituted hydrocarbon group; n is a value from 0 to 4. When n is at least 2, $R^f$ can be the same or different. Examples of bisphenol compounds that can be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations including at least one of the foregoing bisphenol compounds.

Bisphenol compounds such as 2,2,2',2'-tetrahydro-3,3,3', 3'-tetramethyl-1,1'-spirobi-[IH-indene]-6,6'-diol represented by the following formula (VI) can also be used.

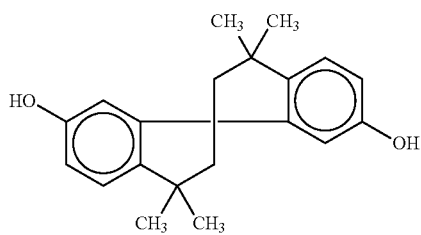 (VI)

In one aspect, the bisphenol compound is bisphenol A.
Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl)carbonate, and di(naphthyl)carbonate. In one aspect, the carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is selected for use. Generally, useful aliphatic diacids have 2 to 40 carbons, for example dodecanedioic acid.

Branched polycarbonates, as well as blends of linear polycarbonate and a branched polycarbonate may also be used in the composition. The branched polycarbonates can be prepared by adding a branching agent during polymerization. These branching agents can include polyfunctional organic compounds containing at least three functional groups, which can be hydroxyl, carboxyl, carboxylic anhydride, haloformyl, and combinations including at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl)$\alpha,\alpha$-dimethyl benzyl)phenol), 4-chloroformyl phthalic anhydride, trimesic acid, benzophenone tetracarboxylic acid, or the like, or combinations including at least one of the foregoing branching agents. The branching agents can be added at a level of 0.05 to 2.0 weight percent (wt %), based upon the total weight of the polycarbonate in a given layer.

In one aspect, the polycarbonate can be produced by a melt polycondensation reaction between a dihydroxy compound and a carbonic acid diester. Examples of the carbonic acid diesters that can be utilized to produce the polycarbonates are diphenyl carbonate, bis(2,4-dichlorophenyl)carbonate, bis(2,4,6-trichlorophenyl)carbonate, bis(2-cyanophenyl) carbonate, bis(o-nitrophenyl)carbonate, ditolyl carbonate, m-cresyl carbonate, dinaphthyl carbonate, bis(diphenyl)carbonate, bis(methylsalicyl)carbonate, diethyl carbonate, dimethyl carbonate, dibutyl carbonate, dicyclohexyl carbonate, or the like, or combinations including at least one of the foregoing carbonic acid diesters. In one aspect, the carbonic acid diester is diphenyl carbonate or bis(methylsalicyl)carbonate.

In one aspect, the polycarbonate is a melt polycarbonate. In another aspect, the polycarbonate is an interfacial polycarbonate. In a further aspect, the melt polycarbonate is made by a melt polymerization process. In an even further aspect, the interfacial polycarbonate is made by an interfacial polymerization process.

The number average molecular weight of the polycarbonate can be 3,000 to 1,000,000 grams per mole (g/mole). Within this range, the number average molecular weight can be greater than or equal to 10,000 g/mol in one aspect, greater than or equal to 20,000 g/mol in another aspect, and greater than or equal to 25,000 g/mole in yet another aspect. The number average molecular weight can be less than or equal to 100,000 g/mole in one aspect, less than or equal to 75,000 g/mol in an alternative aspect, less than or equal to 50,000 g/mol in still another alternative aspect, and less than or equal to 35,000 g/mole in yet another alternative aspect.

In one aspect, the polycarbonate can comprise different grades of polycarbonates. The polycarbonate can have different additional functional groups which may or may not be incorporated into the polymer. For example, the polycarbonate can be selected from PC 105 and/or PC 175, both commercially available from SABIC's Innovative Plastics business. Further, the polycarbonate can be a high viscosity polycarbonate, for example, the polycarbonate can have a Melt Volume Rate (MVR) of less than or equal to 10 grams (g)/10 minute (min), specifically, less than or equal to 6 g/10 min as measured at 300 degrees Celsius (° C.)/1.2 (kilograms) kg. Non-limiting example of additional functional groups include aromatic groups, phenyl groups, for example, bisphenol A (BPA), alkyl groups, halogen groups, or amide groups.

The polycarbonate can have an MVR of 2 grams (g) per 10 minute (min) to 250 g/10 min at 300 degrees Celsius (° C.)/1.2 (kilograms) kg. For example, the MVR can be 23.5 g/10 min to 28.5 g/10 min.

The polycarbonate can, for example, be made by a melt process and can have an endcap level [ratio of phenol endgroups to total endgroup amount in % (OH+Phenol)] of greater than 50%, specifically, greater than 80%, more specifically, 80 to less than 100%, more specifically, 80 to 95%.

In one aspect, the number average molecular weight of the polycarbonate polymer is measured using a standard. In another aspect, the standard is polystyrene. As such, when reference is made to "polystyrene basis," this reference indicates the standard which is used.

In one aspect, the polycarbonate polymer can comprise a polycarbonate polymer with a number average molecular weight of from 15,000 to 150,000 Dalton (polystyrene basis). In a further aspect, the polycarbonate polymer can comprise a polycarbonate polymer with a number average molecular weight of from 27,000 to 80,000 Dalton (polystyrene basis). In an even further aspect, the polycarbonate polymer can be a BPA polycarbonate with a number average molecular weight of from 27,000 to 80,000 Dalton (polystyrene basis). In another aspect, the polycarbonate copolymer can comprise BPA in combination with, for example, dimethylbisphenol cyclohexanone (DMBPC), Isosorbide, aliphatic diols or acids, for example, sebacic acid with a number average molecular weight of from 27,000 to 80,000 Dalton (polystyrene basis).

In one aspect, the polycarbonate comprises at least 5 wt % relative to the thermoplastic composition's total weight percentage. In a further aspect, the composition comprises greater than or equal to 90 wt %, specifically, greater than or equal to 91 wt %, more specifically, greater than or equal to 95 wt %, still more specifically, greater than or equal to 99 wt %, still more specifically, greater than 99.4 wt % polycarbonate relative to the thermoplastic composition's total weight percentage. In a further aspect, the polycarbonate comprises at least 99 wt % relative to the thermoplastic composition's total weight percentage. In another aspect, the total polycarbonate amount is 5 wt % to 99.7 wt %, relative to the thermoplastic composition's total weight percentage. In a further aspect, the total polycarbonate amount is 1 wt % to 99.7 wt % relative to the thermoplastic composition's total weight percentage. In an even further aspect, the total polycarbonate amount is 1 wt % to 99.92 wt % relative to the thermoplastic composition's total weight percentage. In a yet further aspect, the total polycarbonate amount is 1 wt % to 99.5 wt % relative to the thermoplastic composition's total weight percentage. In another aspect, the total polycarbonate amount is 1 wt % to 99.91 wt % relative to the thermoplastic composition's total weight percentage. In a further aspect, the total polycarbonate amount is 1 wt % to 99.47 wt % relative to the thermoplastic composition's total weight percentage.

In one aspect, the polycarbonate is an interfacial polycarbonate.

Release Agent

The disclosed compositions also comprise a second component. The second component is a triacylglyceride release agent.

In one aspect, the composition comprises a release agent of formula (A)

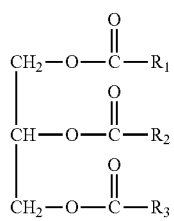

(A)

wherein $R_1$, $R_2$, and $R_3$ can be the same or different hydrocarbon chains with 8 to 20 carbon atoms and 0 to 6 unsaturations.

In one aspect, $R_1$, $R_2$, and $R_3$ are independently selected from $C_8$-$C_{20}$ alkyl, $C_8$-$C_{20}$ haloalkyl, $C_8$-$C_{20}$ polyhaloalkyl, $C_8$-$C_{20}$ alkene, and $C_8$-$C_{20}$ alkoxy. In another aspect, $R_1$, $R_2$, and $R_3$ are independently selected from $C_{17}H_{35}$.

In at least one aspect, the triacylglyceride release agent comprises glycerol tristearate (GTS). GTS is a solid at room temperature with a melting point of 72 to 75° C., which facilitates handling of the release agent. This fully esterified glycerol molecule does not contain free hydroxyl groups as glycerol monostearate (GMS), hence no degradation of the thermoplastic composition is promoted. A smaller molecule than PETS, GTS retains sufficient mobility to partially migrate to the surface of the molten providing better release than PETS, yet has a lower plate-out than GMS.

In one aspect, the triacylglyceride release agent is present in an amount of 0.01 weight percent to 5 weight percent relative to the total weight of the thermoplastic composition. In a further aspect, the triacylglyceride release agent is present in an amount of 0.01 weight percent to 3 weight percent relative to the total weight of the thermoplastic composition. In another aspect, the glycerol tristearate is present in an amount of 0.01 weight percent to 5 weight percent relative to the total weight of the thermoplastic composition. In an even further aspect, the glycerol tristearate is present in an amount of 0.01 weight percent to 3 weight percent relative to the total weight of the thermoplastic composition.

In one aspect, the triacylglyceride release agent is present in an amount of 0.05 to 0.2 weight percent, specifically, 0.05 to 0.15 weight percent relative to the total amount of the thermoplastic composition.

Second Release Agent

In at least one aspect, the thermoplastic composition comprises additional release agent(s). In one aspect, the thermoplastic composition comprises a release agent (referred to as a second release agent) selected from a fully esterified polyol fatty acid ester; a polyol fatty acid partial ester; a saturated alpha olefin oligomer; a linear low density polyethylene (LLDPE); or a combination comprising at least one of the foregoing release agents.

In one aspect, the thermoplastic composition comprises a second release agent selected from a fully hydrated polyol fatty acid ester; a polyol fatty acid partial ester; a saturated alpha olefin oligomer; a linear low density polyethylene; or combinations comprising at least one of the foregoing.

In another aspect, the polyol fatty acid partial ester comprises an aliphatic polyol having 2 to 6 free hydroxyl moieties and a $C_{10}$-$C_{36}$ fatty acid ester moiety. In one aspect, the second release agent comprises polyalpha-olefin oligomer (PAO). In a further aspect, the thermoplastic composition comprises at least one second release agent selected from pentaerythritol tetrastearate; glycerol monostearate; saturated poly(alpha) oligomer; and a linear low density polyethylene. In an even further aspect, the thermoplastic composition comprises at least two second release agents selected from pentaerythritol tetrastearate (PETS); glycerol monostearate (GMS); saturated poly(alpha) oligomer; and a linear low density polyethylene. In a yet further aspect, the thermoplastic composition comprises at least one second release agent comprising pentaerythritol tetrastearate; glycerol monostearate; saturated poly(alpha) oligomer; a linear low density polyethylene.

In a further aspect, the thermoplastic composition comprises at least one second release agent having animal or vegetal origin. In one aspect, the second release agent having animal or vegetal origin where the animal origin is 100% stearate based and the vegetal origin at least 50% palm based origin. In another aspect, the release agent of animal or vegetal origin comprises polyol fatty acid ester; a polyol fatty acid partial ester; a saturated alpha olefin oligomer; or a linear low density polyethylene; or combinations comprising at least one of the foregoing.

In one aspect, the thermoplastic composition further comprises a third release agent. In another aspect, the third release agent can be selected from a fully polyol fatty acid ester; a polyol fatty acid partial ester; a saturated alpha olefin oligomer; a linear low density polyethylene; or combinations comprising at least one of the foregoing. In a further aspect, the third release agent has animal or vegetal origin.

The chosen release agent should not affect basic requirements such as transparency, mechanical properties, or the glass transition temperature (Tg).

In one aspect, PETS is solid at room temperature with a melting point (Mp) 60-63° C., as with most small molecule additives high loadings might deteriorate basic performance of the final thermoplastic composition e.g. loss of ductility and a decrease in Tg. In a further aspect, PAO, for some applications, is a better release agent than PETS at equal loadings while maintains transparency. However, PAO has low volatility (flashpoint (Fp) 210° C.). Without being bound by theory, the low volatility of PAO may cause difficulties when processing, along with the liquid nature of PAO, making it difficult to homogenize mixtures of PAO with other components. Besides, in very high loadings, PAO might leave an oily feel to the molded parts that can interfere with secondary operations. In an even further aspect, GMS gives the best release performance compared to PAO and PETS in per mol basis. Without being bound by theory, a smaller molecule than PETS, GMS' effectiveness relies on the ability of the molecule to migrate to the interface between the thermoplastic composition and the mold. This same mobility, which brings higher release performance, can also lead to excessive plate-out causing cosmetic issues on the molded parts. A fine-tuning of the release agent amount might bring to the right balance between adequate release performance and acceptable generation of plate-out. Nevertheless, GMS has the two free hydroxyl groups in the molecule. These free hydroxyl groups may react with carbonate bonds in the thermoplastic composition, causing Mw degradation. The addition of phosphorous acid may inhibit the hydroxyl group's reactivity however, at the expense of hydrolytic stability of the final material.

Any of the three previously discussed release agents (PETS, PAO & GMS) can be combined with GTS to give improved release. The synergistic effect of the combined release agents can greatly improve the release performance.

In one aspect, the second release agent is present in an amount of 0.01 weight percent to 5 weight percent relative to the total weight of the thermoplastic composition. For example, the second release agent is present in an amount of 0.01 weight percent to 3 weight percent, specifically, 0.25 to 0.55 weight percent, more specifically, 0.35 to 0.55 weight percent relative to the total weight of the thermoplastic composition.

The composition can comprise a total amount of release agent of less than or equal to 0.6 weight percent, specifically, 0.3 to 0.6 weight percent, more specifically, 0.3 to 0.55 weight percent. In one aspect, the ratio of the second release agent to the triacylglyceride release agent is 2 to 5, specifically, 2.5 to 4.5.

Other Additives

The disclosed compositions can further optionally comprise additive(s) conventionally used in the manufacture of polymer resin with the proviso that the additives do not adversely affect the desired properties of the resulting composition. Mixtures of additives can also be used. Such additives can be mixed at a suitable time during the mixing of the components for forming the composite mixture. For example, the disclosed compositions can comprise one or more fillers, stabilizers, flame-retardants, impact modifiers, colorants, and/or mold release agents. In one aspect, the composition further comprises one or more optional additives selected from an antioxidant, flame retardant, inorganic filler, and stabilizer. The composition can be free of one or both of an antistatic agent and a flame retardant.

Heat stabilizers include, for example, organo phosphites such as triphenyl phosphite, tris-(2,6-dimethylphenyl)phosphite, tris-(mixed mono- and di-nonylphenyl) phosphate or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler. In one aspect, the heat stabilizer is used in amounts of from 0.01 to 0.2 parts by weight based on 100 parts by weight of the total composition.

Antioxidants include, for example, organophosphites such as tris(nonyl phenyl)phosphite, tris(2,4-di-t-butylphenyl) phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Light stabilizers include, for example, benzotriazoles such as 2-(2-hydroxy-5-methylphenyl) benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Antistatic agents include, for example, sodium stearyl sulfonate, sodium dodecylbenzenesulfonate, or the like, or combinations of the foregoing antistatic agents. In one aspect, carbon fibers, carbon nanofibers, carbon nanotubes, carbon black, or any combination of the foregoing may be used in a polymeric resin containing chemical antistatic agents to render the composition electrostatically dissipative. Likewise, the thermoplastic composition can be free of antistatic agents, e.g., can be free of glycerol monostearate, sodium stearyl sulfonate, sodium dodecylbenzenesulfonate, carbon fibers, carbon nanofibers, carbon nanotubes, carbon black.

In another aspect, the UV stabilizer comprises 2-[2-hydroxy-3,5-di(1,1-dimethylbenzylphenyl)]-2H-benzotriazole; 2,2'-methylenebis(6-(2H-benzotriazol-2-yl)-4-(1,1,3,3-tetramethylbutyl) phenol); or pentaerythritol tetrakis(2-cyano-3,3-diphenylacrylate), or a combination comprising at least one of the foregoing. In a further aspect, the UV stabilizer comprises 2-benzotriazolyl-4-tert-octylphenol.

UV stabilizers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl) oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy] methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers comprising at least one of the foregoing e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Properties

In the present disclosure, the disclosed thermoplastic composition can exhibit maintained or improved mechanical, thermal, and morphological properties. In one aspect, thermoplastic composition maintains good mechanical properties while maintaining relatively low material costs.

In the present disclosure, low discoloration due to degradation and low surface defects due to the volatility of the release agents is desirable. In a further aspect, the thermoplastic composition shows the reduction of aesthetic defects on the surface of the molded part. Previously, during processing, volatile compounds will migrate to the surface of the thermoplastic composition forming a solid deposit on the mold surface. As such, undesired marks on the surface of the final item may occur. In one aspect, the thermoplastic composition utilizes less volatile compounds, shows less solid deposits on the surface, and less marks on the surface. In another aspect, the less volatile compounds are release agents.

In one aspect, the release property is shown using the friction coefficient because the friction coefficient influences the demolding properties of injection-molded parts. In most injection molding processes the demolding force has to overcome a maximum friction force due to sticking of the part in the mold cavity (static friction coefficient) and sliding of the part out of the cavity on a lower sliding friction coefficient. Therefore, release performance is measured as friction force vs. cycle time and reported as a coefficient of friction (CoF). The mold release performance was evaluated using an injection molding machine Arburg 370 with a screw diameter of 25 millimeter (mm) and injection velocity 40 mm/second (s). The friction coefficient during demolding was measured at 300° C./100° C. Melt/Mold temperature. The test standard is UL International TTC GmbH.

In one aspect, a friction coefficient of the thermoplastic composition is less than 0.58. In another aspect, a friction coefficient of the thermoplastic composition is 0.1 to 0.5 or 0.15 to 0.5. In another aspect, a friction coefficient is 0.16 to 0.33. In a further aspect, the dynamic friction coefficient is 0.16 to 0.23. In a further aspect, the dynamic friction coefficient is less than or equal to 0.22, specifically, less than or equal to 0.20, more specifically, 0.16 to 0.20. In another aspect, the static friction coefficient is 0.28 to 0.33. In another aspect, the static friction coefficient is less than or equal to 0.33, specifically, less than or equal to 0.30, more specifically, 0.10 to 0.30.

In one aspect, the friction coefficient for GTS and another release agent is lower than the friction coefficient for either release agent singly.

In one aspect, the thermoplastic composition with GTS and a second release agent are processed with the preferable properties of the fatty acids with respect to flow, impact properties, visual aesthetics and colorability of the polycarbonate polymer.

In one aspect, the GTS allows the preparation of thermoplastic compositions with very low friction coefficient and lowered yellowing index while allowing sufficient flow for injection molding of relatively large parts (which is difficult with pure polycarbonate resins) and retaining practical impact.

Conventional thermoplastic compositions comprising polycarbonate are susceptible to color degradation over time. The parameters dYi (or dE) are commonly used parameters to measure color stability. These parameters also show the thermoplastic composition's heat aging stability. These parameters are typically evaluated using the thermoplastic composition at 120° C. for 5,000 hours or for 3,000 hours. The test standard is D1925 and uses a 2.5 mm cp. For this test, the yellowing indicates a worsening of the aging performance. In one aspect, the color stability of the thermoplastic composition shows a lower yellowness index (Yi) than the reference thermoplastic composition without a release agent. For example, the Yi of the thermoplastic composition is less than 10, specifically, less than or equal to 5.

The thermoplastic composition can have a transparency of initial transmission greater than or equal to 90%.

The flash point (Fp) determines the volatility of the release agent during the processing. The lower the flash point of the thermoplastic composition, the higher the possibility to plate out with surface defects as a result. In one aspect, the Fp is at least 250° C. In another aspect, the Fp ranges from 250° C. to 400° C. In a further aspect, the Fp ranges from 250° C. to 350° C.

In one aspect, the composition exhibits a notched izod impact energy that is equal to that exhibited by a molded article formed from an identical reference composition in the absence of the triacylglyceride release agent. In one aspect, the composition exhibits a notched izod impact energy that is at least 10% greater than that exhibited by a molded article formed from an identical reference composition in the absence of the triacylglyceride release agent. In another aspect, the composition exhibits a notched izod impact energy that is at least 100% greater than that exhibited by a molded article formed from an identical reference composition in the absence of the triacylglyceride release agent. Specifically, the composition can have a notched Izod impact at $-10°$ C. of greater than or equal to 40 kilojoules per meter squared ($kJ/m^2$), specifically, greater than 50 $kJ/m^2$ determined using a 3.2 mm thick, molded Izod notched impact (NI) bar per ASTM D256-2010.

In one aspect, the molded article formed from the composition exhibits a percent ductility of 100% according to ASTM D256-2010. In another aspect, the molded article formed from the composition exhibits a percent ductility of at least 90% according to ASTM D256-2010. In a further aspect, the molded article formed from the composition exhibits a percent ductility of at least 80% according to ASTM D256-2010. In an even further aspect, the molded article formed from the composition exhibits a percent ductility of at least 50% according to ASTM D256-2010.

The blended thermoplastic compositions, or compounds, of disclosed herein provide robust plating performance while maintaining good mechanical properties (e.g., Izod impact strength higher than 400 Joules per meter). Evaluation of the mechanical properties can be performed through various tests, such as Izod test, Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

Method

In one aspect, a method for making a thermoplastic composition comprising
1. Forming a blend composition comprising:
  a. a polycarbonate polymer; and
  b. a triacylglyceride release agent; and
  c. a second release agent; and
2. Molding the blend composition.

In another aspect, the triacylglyceride release agent comprises glycerol tristearate. In one aspect, the glycerol tristearate is present in the formed blend composition in an amount of 0.01 weight percent to 5 weight percent relative to the total weight of the blend composition. In another aspect, the glycerol tristearate is present in the formed blend composition in an amount of 0.01 weight percent to 3 weight percent relative to the total weight of the blend composition. In a further aspect, the formed blend composition comprises a second release agent selected from selected from pentaerythritol tetrastearate; glycerol monostearate; saturated poly(alpha) oligomer; a linear low density polyethylene. In an even further aspect, the formed blend composition comprises at least two second release agents selected from pentaerythritol tetrastearate (PETS); glycerol monostearate (GMS); saturated poly(alpha) oligomer; and a linear low density polyethylene. In a yet further aspect, the formed blend composition comprises at least one second release agent comprising pentaerythritol tetrastearate; glycerol monostearate; saturated poly(alpha) oligomer; a linear low density polyethylene.

In one aspect, the polyol fatty acid partial ester comprises an aliphatic polyol having from 2 to 6 free hydroxyl moieties and a $C_{10}$-$C_{36}$ fatty acid ester moiety.

In one aspect, the polycarbonate is an interfacial polycarbonate.

In one aspect, the method comprises forming a molded article from the formed blend composition. In a further aspect, the molded article exhibits lower release forces during demolding of the parts than that exhibited by a molded article formed from an identical reference composition in the absence of the glycerol tristearate release agent. In another aspect, the molded article exhibits fewer aesthetic defects on the surface of the molded part than that exhibited by a molded article formed from an identical reference composition in the absence of the glycerol tristearate release agent. In a further aspect, the molded article exhibits a lower dYi than that exhibited by a molded article formed from an identical reference composition in the absence of the triacylglyceride release agent.

In another aspect, the method comprises a polymer melt process. In a further aspect, the polymer melt process comprises injection molding, extrusion, rotational molding, blow molding, and thermoforming.

In one aspect, the thermoplastic composition further comprises a third release agent. In another aspect, the third release agent comprises selected from a fully polyol fatty acid ester; a polyol fatty acid partial ester; a saturated alpha olefin oligomer; or a linear low density polyethylene; or combinations comprising at least one of the foregoing.

Articles

In one aspect, an article of manufacture is formed from the blended composition disclosed above. Further, the article of manufacture can be an injection molded part. In a further aspect, the article of manufacture is a large article, such as an airplane part. In a yet further aspect, the article comprises an airplane part, electrical part, electronic application part, food service item part, medical device part, animal cage part, electrical connector part, enclosure for electrical equipment, electric motor part, an automotive part, power distribution equipment part, communication equipment part, computer part, or construction application part.

In one aspect, the polycarbonate is an interfacial polycarbonate. In one aspect, the polycarbonate is a melt polycarbonate.

In one aspect, the molded article has a thickness ranging from 1.2 mm to 2.0 mm. For example, the molded article has a thickness of 1.6 mm. In another aspect, the molded article has a thickness ranging from 2.8 to 3.5 mm. For example, the molded article has a thickness of 3.2 mm.

Still further, the resulting composite mixture can be used to provide any desired shaped, formed, or molded articles. For example, the composite mixture is molded into useful shaped articles by a variety of means such as injection molding, extrusion, rotational molding, blow molding and thermoforming. As noted above, the disclosed composites are particularly well suited for use in the manufacture of electronic components and devices. As such, according to some aspects, the disclosed composites can be used to form articles such as printed circuit board carriers, burn in test sockets, flex brackets for hard disk drives, and the like.

Formed articles include, for example, computer and business machine housings, home appliances, trays, plates, handles, helmets, automotive parts such as instrument panels, cup holders, glove boxes, interior coverings, and the like. In various further aspects, formed articles include, but are not limited to, food service items, medical devices, animal cages, electrical connectors, enclosures for electrical equipment, electric motor parts, automotive parts, power distribution equipment, communication equipment, computers, and the like, where the devices can have molded in snap fit connectors. In a further aspect, articles of the present disclosure can comprise exterior body panels and parts for outdoor vehicles and devices including automobiles, protected graphics such as signs, outdoor enclosures such as telecommunication and electrical connection boxes, and construction applications such as roof sections, wall panels, and glazings. The article can be a multilayer article comprising the disclosed polycarbonates and can include articles which will be exposed to UV-light, whether natural or artificial, during their lifetimes, and most particularly outdoor articles; i.e., those intended for outdoor use. Suitable articles are exemplified by enclosures, housings, and panels, for example, outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings (e.g., desk-top computer housings; portable computer housings; lap-top computer housings; palm-held computer housings; and monitor housings); printer housings; keyboards; facsimile machine housings; copier housings; telephone housings (e.g., mobile phone housings); radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present disclosure pertains to articles comprising the disclosed blended polycarbonate compositions. In a further aspect, the article comprising the disclosed blended polycarbonate compositions is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

In various aspects, the disclosure relates to articles comprising a disclosed composition. In a further aspect, the article is used in electrical and electronic applications. In a still further aspect, the article is selected from components for cell phones and cell phone covers, components for batteries, components for computer housings, computer housings and business machine housings such as housings for monitors, hand-held electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like. In a yet further aspect, the compositions are of particular utility in the manufacture of thin walled articles such as housings for electronic devices. In a still further aspect, additional examples of articles that can be formed from the compositions include electrical parts, such as relays, batteries, capacitors, and enclosures, consumer electronics such as enclosures and parts for laptops, desktops, docking stations, personal digital assistants (PDAs), digital cameras, desktops, and telecommunications parts such as parts for base station terminals.

EXAMPLES

The following examples are put forth so as to provide those of ordinary skill in the art with a complete disclosure and description of how the compositions disclosed and claimed herein can be made and evaluated, and are intended to be purely exemplary and are not intended to limit the disclosure. Unless indicated otherwise, parts are parts by weight, temperature is in ° C. or is at ambient temperature, and pressure is at or near atmospheric.

In the following examples, thermoplastic compositions of the present disclosure were manufactured and tested. Table 1 lists the properties tested, including the test description, test standard, specimen tested, the property, and the units for the measurement.

TABLE 1

| description | test standard | specimen | property | units |
| --- | --- | --- | --- | --- |
| UL TTC | UL International TTC GmbH | 15 mm diameter disk | CoF | n.a. |
| Yi | D1925 | 2.5 mm cp | Yi | n.a. |
| MVR (300° C., 1.2 kg) | ISO 1133 | pellets | MVR | cc/10 min |

In addition to polycarbonate, Table 2 lists the materials employed in the examples. The PC used was an interfacial polycarbonate with an MVR of 5.1 to 8 g/10 min at 300° C./1.2 kg, available from SABIC's Innovative Plastics business.

TABLE 2

| component | CAS | chemical description | source, vendor |
| --- | --- | --- | --- |
| PETS | 115-83-3 | Pentaerythrityl tetrastearate. | Emery |
| PAO | 68037-01-4 | Polyalpha-olefin olygomer | |
| GTS | 555-43-1 | Glycerol tristearate | Emery/Danisco |
| GMS | 31566-31-1 | Glyceryl monostearate (2,3-dihydroxypropyl octadecanoate) | Riken Vitamin |

Examples 1-4

Vary PETS Loading

In Examples 1-4, a thermoplastic composition comprising polycarbonate and various loadings of pentaerythrityl tetrastearate (PETS) was prepared. The various loadings of PETS were 0 wt %, 0.1 wt %, 0.4 wt %, and 1 wt %. The thermoplastic compositions were prepared and extruded into pellet form.

The mold release performance was evaluated using an injection molding machine Arburg 370 with a screw diameter of 25 mm and injection velocity 40 mm/s. The friction coefficient during demolding was measured at 300° C./100° C. Melt/Mold temperature. The friction coefficient (CoF) results were listed below in Table 3 and FIG. 1, where the curves for the static and dynamic coefficients of friction are denoted by the diamonds and the squares, respectively.

TABLE 3

| Example | PETS (%) | Static CoF | Dynamic CoF |
|---|---|---|---|
| 1 | 0 | 0.584 | 0.48 |
| 2 | 0.1 | 0.448 | 0.358 |
| 3 | 0.4 | 0.401 | 0.302 |
| 4 | 1 | 0.349 | 0.25 |

FIG. 1 shows the static and dynamic coefficients of PETS loading. As the thermoplastic composition loading of PETS increased, the release performance improved, the friction coefficient decreased, and the sliding force decreased. The results in Table 3 and FIG. 1 show that the addition of small amounts of PETS to the thermoplastic composition improve the release performance. The release performance continued to improve with increased loading of PETS, however, the impact of the loading decreases. The data shows a non-linear correlation and suggests that the release performance begins to level out beyond a loading of 0.4 wt %.

Examples 5-11

Table 4 lists the release agents, the loading in the thermoplastic composition, and the friction force for Examples 5-11.

TABLE 4

| Example | Factor | Load (%) | Static CoF | Dynamic CoF |
|---|---|---|---|---|
| 5 | PAO | 0.6 | 0.444 | 0.338 |
| 6 | GMS | 0.1 | 0.369 | 0.258 |
| 7 | GTS | 0.1 | 0.462 | 0.363 |
| 8 | GTS/PETS | 0.1/0.3 | 0.363 | 0.254 |
| 9 | GTS/PETS | 0.1/0.4 | 0.284 | 0.164 |
| 10 | GMS/GTS | 0.1/0.1 | 0.327 | 0.228 |
| 11 | PETS/GMS | 0.4/0.1 | 0.332 | 0.221 |

As can be seen in Tables 3 and 4, Examples 1-7 show the friction force for a single release agent. Examples 8-11 show the friction force for a blend of release agents. The compositions in Examples 5-11 were processed using the same conditions as those disclosed above for Examples 1-4.

In Example 7, a single release agent, GTS, was added to the thermoplastic composition and extruded. Similarly, in Example 3, a single release agent, PETS, was added to the composition and extruded. In Example 9, a thermoplastic composition comprising a blend of GTS/PETS was prepared and extruded. As seen from Tables 3 and 4, the blend of GTS/PETS had a lower static friction coefficient than the static friction coefficient of either single release agent, GTS or PETS. As such, the blend showed an improvement in the static friction coefficient over the single release agent.

In Example 6, a single release agent, GMS, was added to the composition and extruded. Similarly, in Example 7, a single release agent, GTS, was added to the thermoplastic composition and extruded. In Example 10, a thermoplastic composition comprising a blend of GMS/GTS was prepared and extruded. As seen in Tables 3 and 4, the blend of GMS/GTS had a lower static friction coefficient than the static friction coefficient of either single release agent, GMS or GTS. As such, the blend showed an improvement in the static friction coefficient over the single release agent.

Tables 3 and 4 further show the synergistic effect of the GTS/PETS combination (Example 9) providing the lowest static friction coefficient when compared to GMS/PETS (Example 11) and GTS/GMS (Example 10).

Example 12

Release Agent Effect on Yellowness Index

Conventional thermoplastic compositions comprising polycarbonate were susceptible to color degradation over time. The parameters dYi (or dE) were commonly used parameters to measure color stability. These parameters also showed the thermoplastic composition's heat aging stability. These parameters were evaluated with several release additives in 120° C. for 5,000 hours. The color measurements were performed to obtain the dYi values in FIG. 2.

Figure 2:
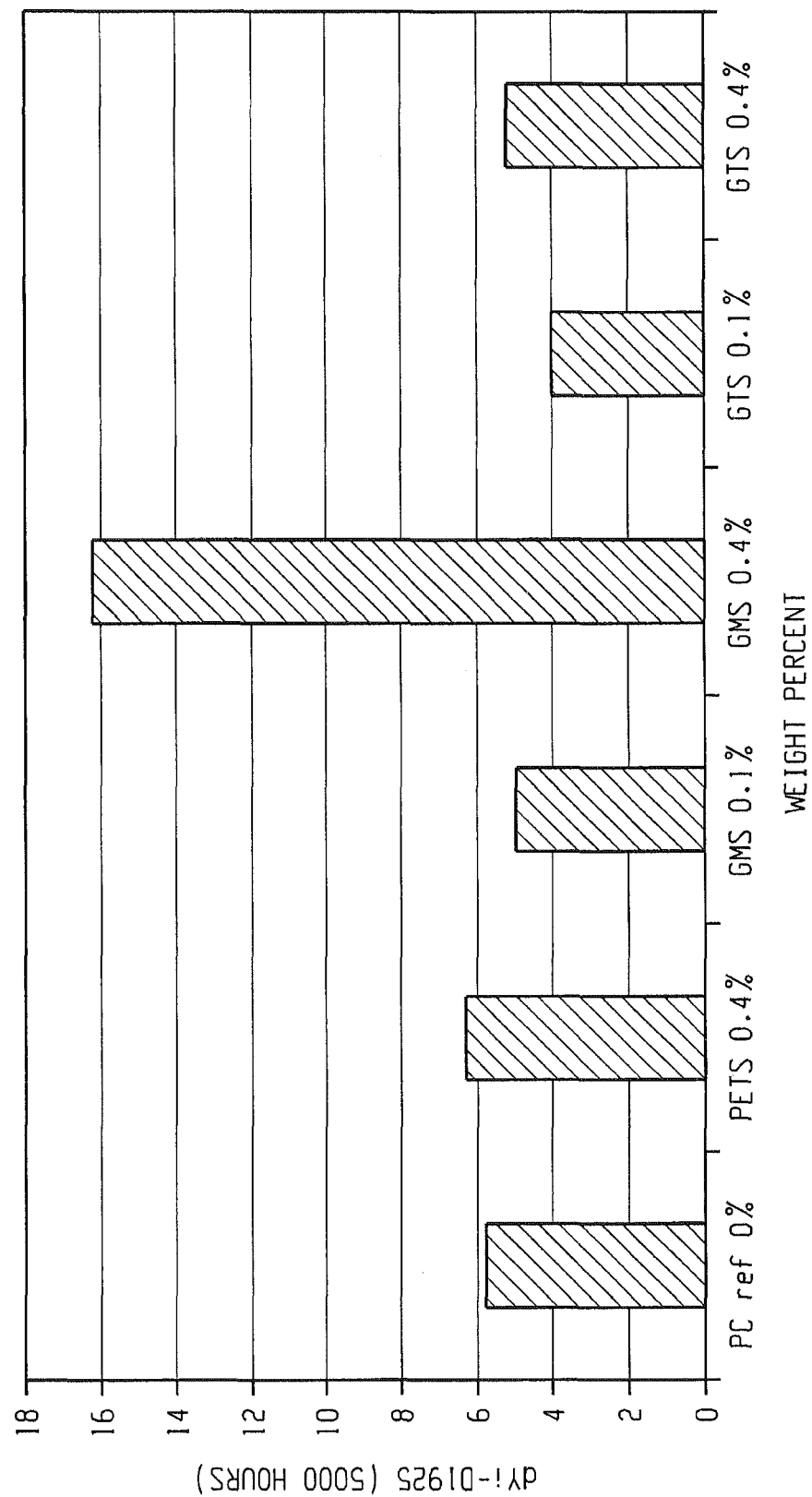
FIG. 2 is a graphical illustration of the dYi data at 5,000 hours of Example 12.

FIG. 2 illustrates graphically the dYi data for thermoplastic compositions with various release agents at various loadings at 5,000 hours.

As shown in FIG. 2, the addition of the GTS release agent improved the intrinsic aging performance of the thermoplastic composition. For example, the thermoplastic composition comprising GTS showed a lower Yi than the reference thermoplastic composition without a release agent. In contrast, the thermoplastic composition comprising a release agent such as PETS or greater amounts of GMS showed a yellowing of the thermoplastic composition. The yellowing indicated a worsening of the aging performance. As such, FIG. 2 shows that a thermoplastic composition comprising GTS will maintain or improve the intrinsic aging performance of the thermoplastic composition.

Example 13

Release Agent Effect on Flash Point

The flash point (Fp) determines the volatility of the release agent during the processing. Table 5 showed the flash point for the thermoplastic composition comprising four release agents, PETS, PAO, GMS, and GTS.

TABLE 5

|  | PETS | PAO | GMS | GTS |
|---|---|---|---|---|
| Fp (° c.) | 342 | 210 | 230 | 327 |

Without being bound by theory, it is believed that the lower the flash point was of the thermoplastic composition, the higher the possibility to plate out with surface defects as a result. Table 5 shows that PAO and GMS have low flash points. Consequently, PAO and GMS caused surface defects on the molded parts. PETS and GTS had a higher flash point. Consequently, PETS and GTS had a lower plate-out and showed fewer surface defects on the molded parts than PAO and GMS.

Example 17 had aesthetic defects. As shown in Table 6, Example 16 comprising GTS had good demolding and no aesthetic defects.

Summary of the Effect of Release Agents

Table 7 shows a summary of data for various compositions.

TABLE 7

| | Example | | | | | | | | |
|---|---|---|---|---|---|---|---|---|---|
| | 1 | 3 | 5 | 6 | 7 | 8 | 9 | 10 | 11 |
| Release agent | None | PETS | PAO | GMS | GTS | GTS/PETS | GTS/PETS | GTS/GMS | GMS/PETS |
| Release agent (wt %) | — | 0.4 | 0.6 | 0.1 | 0.1 | 0.1/0.3 | 0.1/0.4 | 0.1/0.1 | 0.1/0.4 |
| | Properties | | | | | | | | |
| Static CoF | 0.584 | 0.401 | 0.444 | 0.369 | 0.462 | 0.363 | 0.284 | 0.327 | 0.332 |
| Dynamic Cof | 0.480 | 0.302 | 0.338 | 0.258 | 0.363 | 0.254 | 0.164 | 0.228 | 0.221 |

The thermoplastic composition examples comprising GTS provided greater release, improved color stability, lower plate out, and fewer surface defects. The thermoplastic composition examples comprising GTS showed better demolding behavior during the injection molding process, lower friction forces during ejection, good aesthetics, and good color stability.

The inventive thermoplastic composition examples exhibited improved release relative to conventional release in the absence of the GTS. The inventive thermoplastic composition examples were useful for the preparation of low friction coefficient molded articles, films, and/or extruded sheets.

Examples 14-17

Industrial Validation

For industrial validation, thermoplastic compositions were processed with various release agents, as shown in Table 6 and were compared to a test standard, Example 14. Specifically, the thermoplastic compositions of Examples 15-17 were processed at the customer under similar conditions to the composition of Example 14 for comparison. The observations in Table 6 are based on customer feedback on the demolding ability of the materials based on their internal specifications. The parts obtained were further compared visually for surface defects according to customer. Where defects occurred, defects similar to splay were observed in the injection point for defect parts.

TABLE 6

| Example | Release Agent | Release Agent (wt %) | Observations |
|---|---|---|---|
| 14 | Industrial Reference | unknown | Target demolding, No aesthetic defects |
| 15 | PETS | 0.5 | Bad demolding |
| 16 | GTS/PETS | 0.1/0.4 | Improved demolding, no aesthetic defects |
| 17 | GMS/PETS | 0.1/0.4 | Similar demolding, aesthetic defects |

In Table 6, Example 16 (GTS/PETS) and Example 17 (GMS/PETS) were stable during processing with good demolding. Example 16 did not have aesthetic defects, while Example 17 had aesthetic defects. As shown in Table 6, Example 16 comprising GTS had good demolding and no aesthetic defects.

Table 7 illustrates the benefits of adding GTS to a thermoplastic composition. For example, a thermoplastic composition comprising GTS showed excellent release ability, similar to GMS and PAO. Further, a thermoplastic composition comprising GTS was inert to the polycarbonate chain, a benefit over GMS.

Examples 18-21

Impact Retention

Notched Izod impact tests were performed on polycarbonate compositions with different release agents at various temperatures using a 3.2 mm thick, molded notched Izod impact bar per ASTM D 256. The results are shown in Table 8, where D denotes ductile samples with notched Izod impact values of greater than 50 kJ/m$^2$, B denotes brittle samples with notched Izod impact values of less than 30 kJ/m$^2$, DB denotes samples with notched Izod impact values of 40 to 50 kJ/m$^2$, and BD denotes samples with notched Izod impact values of 30 to 40 kJ/m$^2$. Notched Izod Impact Strength is used to compare the impact resistances of plastic materials and was determined.

TABLE 8

| Example | 18 | 19 | 20 | 21 |
|---|---|---|---|---|
| | Release agent | | | |
| PETS (wt %) | 0.5 | 0.4 | — | — |
| GTS (wt %) | — | 0.1 | — | 0.4 |
| PAO (wt %) | — | — | 0.6 | — |
| | Notched Izod Impact Properties | | | |
| At −10° C. | BD | DB | B | D |
| At −5° C. | D | D | DB | D |
| At 0° C. | D | D | D | D |
| At 5° C. | D | D | D | D |
| At 10° C. | D | D | D | D |

Table 8 shows that compositions comprising a combination of GTS and PETS have improved impact properties at low temperatures, where Example 19 comprising PETS and GTS has improved properties at −10° C. as compared to Example 18 comprising only PETS. Table 8 further shows that Example 21 comprising only GTS as the release agent is ductile over all temperatures.

Set forth below are some embodiments of the present composition methods of making the composition and articles formed therefrom.

Embodiment 1: a thermoplastic composition, comprising: a polycarbonate polymer; 0.05 to 0.2 weight percent of a triacylglyceride release agent; and 0.25 to 0.55 weight percent of a tetrastearate second release agent. The total amount of the triacylglyceride release agent and the second release agent is less than or equal to 0.6 weight percent and the weight percent values are based on the total weight of the composition.

Embodiment 2: the composition of Embodiment 1, wherein the triacylglyceride release agent is present in an amount of 0.05 weight percent to 0.15 weight percent relative to the total weight of the thermoplastic composition.

Embodiment 3: the composition of any of Embodiments 1-2, wherein the second release agent in present in an amount of 0.35 weight percent to 0.55 weight percent.

Embodiment 4: the composition of any of Embodiments 1-3, wherein the triacylglyceride release agent comprises glycerol tristearate.

Embodiment 5: the composition of any of Embodiments 1-4, wherein the second release agent comprises pentaerythrityl tetrastearate.

Embodiment 6: the composition of any of Embodiments 1-5, wherein the total amount of release agent is 0.3 weight percent to 0.6 weight percent.

Embodiment 7: the composition of any of Embodiments 1-6, wherein the total amount of release agent is 0.3 weight percent to 0.55 weight percent.

Embodiment 8: the composition of any of Embodiments 1-7, wherein the second release agent comprises pentaerythritol tetrastearate and wherein the composition comprises a third release agent, wherein the third release agent comprises at least one of glycerol monostearate; saturated poly(alpha) oligomer; and a linear low density polyethylene.

Embodiment 9: the composition of any of Embodiments 1-8, further comprising a third release agent.

Embodiment 10: the composition of any of Embodiments 1-9, wherein the second release agent comprises a release agent having animal or vegetal origin.

Embodiment 11: the composition of any of Embodiments 1-10, wherein the polycarbonate is an interfacial polycarbonate.

Embodiment 12: the composition of any of Embodiments 1-11, wherein a ratio of the second release agent and the triacylglyceride release agent is 2 to 5.

Embodiment 13: the composition of any of Embodiments 1-12, wherein the composition has a dynamic friction coefficient of less than or equal to 0.22.

Embodiment 14: the composition of any of Embodiments 1-13, wherein the composition has a static friction coefficient of less than or equal to 0.33.

Embodiment 15: a method for making a composition comprising: forming the composition of any of Embodiments 1-14, wherein the composition is a blend composition; and molding the composition.

Embodiment 6: the method of Embodiment 15, further comprising forming a molded article from the composition.

Embodiment 17: the method of any of Embodiments 15-16, further comprising a polymer melt process.

Embodiment 18: the method of Embodiment 17, wherein the polymer melt process comprises injection molding, extrusion, rotational molding, blow molding, and thermoforming.

Embodiment 19: An article of manufacture formed from the composition of any of Embodiments 1-14.

Embodiment 20: the article of Embodiment 19, wherein the article is an injection molded part.

Embodiment 21: the article of any of Embodiments 19-20, wherein the article comprises an airplane part, electrical part, electronic application part, food service item part, medical device part, animal cage part, electrical connector part, enclosure for electrical equipment, electric motor part, an automotive part, power distribution equipment part, communication equipment part, computer part, or construction application part.

Embodiment 22: the article of any of Embodiments 19-21, wherein the article exhibits lower release forces during demolding of the parts than that exhibited by an article formed from an identical reference composition in the absence of the triacylglyceride release agent.

Embodiment 23: the article of any of Embodiments 19-22, wherein the article exhibits fewer aesthetic defects on the surface of the molded part than that exhibited by an article formed from an identical reference composition in the absence of the triacylglyceride release agent.

Embodiment 24: the article of any of Embodiments 19-23, wherein the article exhibits a lower dYi than that exhibited by an article formed from an identical reference composition in the absence of the triacylglyceride release agent.

Embodiment 25: the article of any of Embodiments 19-21, wherein the article is a large article.

What is claimed is:

1. A thermoplastic composition, comprising:
   a polycarbonate polymer;
   0.05 to 0.2 weight percent of a triacylglyceride release agent, wherein the triacylglyceride release agent comprises glycerol tristearate; and
   0.25 to 0.55 weight percent of a tetrastearate second release agent;
   wherein the total amount of the triacylglyceride release agent and the second release agent is less than or equal to 0.6 weight percent;
   wherein the weight percent values are based on the total weight of the composition.

2. The composition of claim 1, wherein the triacylglyceride release agent is present in an amount of 0.05 weight percent to 0.15 weight percent relative to the total weight of the thermoplastic composition.

3. The composition of claim 1, wherein the second release agent in present in an amount of 0.35 weight percent to 0.55 weight percent.

4. The composition of claim 1, wherein the total amount of release agent is 0.3 weight percent to 0.6 weight percent.

5. The composition of claim 1, wherein the total amount of release agent is 0.3 weight percent to 0.55 weight percent.

6. The composition of claim 1, wherein the second release agent comprises pentaerythritol tetrastearate and wherein the composition comprises a third release agent, wherein the third release agent comprises at least one of glycerol monostearate; saturated poly(alpha) oligomer; and a linear low density polyethylene.

7. The composition of claim 1, further comprising a third release agent.

8. The composition of claim 1, wherein the second release agent comprises a release agent having animal or vegetal origin.

9. The composition of claim 1, wherein the polycarbonate polymer is an interfacial polycarbonate.

10. The composition of claim 1, wherein a ratio of the second release agent and the triacylglyceride the release agent is 2 to 5.

11. The composition of claim 1, wherein the composition has a dynamic friction coefficient of less than or equal to 0.22.

12. The composition of claim 1, wherein the composition has a static friction coefficient of less than or equal to 0.33.

13. The composition of claim 1, comprising:
    0.05 to 0.15 weight percent of the triacylglyceride release agent; and
    0.35 to 0.55 weight percent of the tetrastearate second release agent;
    wherein the composition has one or both of a dynamic friction coefficient of less than or equal to 0.22 and a static friction coefficient of less than or equal to 0.33.

14. A thermoplastic composition, comprising:
    a polycarbonate polymer;
    0.05 to 0.2 weight percent of a triacylglyceride release agent wherein the triacylglyceride release agent comprises glycerol tristearate; and
    0.25 to 0.55 weight percent of a tetrastearate second release agent, wherein the second release agent comprises pentaerythrityl tetrastearate;
    wherein the total amount of the triacylglyceride release agent and the second release agent is less than or equal to 0.6 weight percent;
    wherein the weight percent values are based on the total weight of the composition.

15. A thermoplastic composition, comprising:
    a polycarbonate polymer;
    0.05 to 0.15 weight percent of a triacylglyceride release agent, wherein the triacylglyceride release agent comprises glycerol tristearate; and
    0.35 to 0.55 weight percent of a tetrastearate second release agent, wherein the second release agent comprises pentaerythrityl tetrastearate;
    wherein the total amount of the triacylglyceride release agent and the second release agent is less than or equal to 0.6 weight percent;
    wherein the weight percent values are based on the total weight of the composition.

16. An article of manufacture formed from the composition of claim 1.

17. The article of claim 16, wherein the article is an injection molded part.

18. The article of claim 16, wherein the article is an extruded film or a sheet.

19. The article of claim 16, wherein the article is a computer housing.

20. The article of claim 16, wherein the article is a telephone housing.

21. The article of claim 16, wherein the article is an automotive part, and wherein the automotive part is a panel, a console, a bumper, a fascia, a grille, a wheel cover, a door handle, a spoiler, a window frame, a headlamp, a tail lamp, a tail lamp housing, a license plate enclosure, a roof rack, a running board, a seat, a steering wheel, a bezel, a mirror housing, a step, a knob, a button, or a lever.

22. The article of claim 16, wherein the article is a component of a lighting fixture or a light panel.

23. The article of claim 16, wherein the article is selected from the group consisting of an airplane part, electrical part, electronic application part, food service item part, medical device part, animal cage part, electrical connector part, enclosure for electrical equipment, electric motor part, automotive part, power distribution equipment part, communication equipment part, computer part, or construction application part.

24. The article of claim 16, wherein the article exhibits lower release forces during demolding of the parts than that exhibited by an article formed from an identical reference composition in the absence of the triacylglyceride release agent.

25. The article of claim 16, wherein the article exhibits fewer aesthetic defects on the surface of the molded part than that exhibited by an article formed from an identical reference composition in the absence of the triacylglyceride release agent.

26. The article of claim 16, wherein the article exhibits a lower dYi than that exhibited by an article formed from an identical reference composition in the absence of the triacylglyceride release agent.

27. An article of manufacture formed from the composition of claim 15.

28. A method for making a composition comprising: forming the composition of claim 1, wherein the composition is a blend composition; and molding the composition.

* * * * *